(12) United States Patent
Kessler

(10) Patent No.: US 11,038,856 B2
(45) Date of Patent: Jun. 15, 2021

(54) SECURE IN-LINE NETWORK PACKET TRANSMITTAL

(71) Applicant: Marvell Asia Pte, Ltd., Singapore (SG)

(72) Inventor: Richard E. Kessler, Shrewsbury, MA (US)

(73) Assignee: MARVELL ASIA PTE, LTD., Singapore (SG)

(*) Notice: Subject to any disclaimer, the term of this patent is extended or adjusted under 35 U.S.C. 154(b) by 325 days.

(21) Appl. No.: 16/142,871

(22) Filed: Sep. 26, 2018

(65) Prior Publication Data

US 2020/0099669 A1 Mar. 26, 2020

(51) Int. Cl.
*H04L 29/06* (2006.01)
*H04L 12/861* (2013.01)
*H04L 12/931* (2013.01)

(52) U.S. Cl.
CPC ........ *H04L 63/0485* (2013.01); *H04L 49/506* (2013.01); *H04L 49/9068* (2013.01); *H04L 63/164* (2013.01)

(58) Field of Classification Search
CPC ............... H04L 63/0485; H04L 49/506; H04L 49/9068; H04L 63/164
See application file for complete search history.

(56) References Cited

U.S. PATENT DOCUMENTS

| | | | |
|---|---|---|---|
| 6,910,133 B1 | 6/2005 | Cohn | |
| 7,305,567 B1* | 12/2007 | Hussain | H04L 9/0643 380/264 |
| 7,558,925 B2* | 7/2009 | Bouchard | G06F 12/06 711/154 |
| 7,742,412 B1* | 6/2010 | Medina | H04L 47/11 370/231 |
| 7,814,310 B2* | 10/2010 | Bouchard | H04L 63/164 713/153 |
| 8,074,267 B1 | 12/2011 | Stimpson | |
| 8,185,713 B2* | 5/2012 | Shin | G06F 3/061 711/167 |
| 8,358,651 B1* | 1/2013 | Kadosh | H04L 69/22 370/360 |
| 8,897,315 B1* | 11/2014 | Arad | H04L 49/252 370/428 |
| 9,229,792 B1* | 1/2016 | Gandhe | G06F 9/546 |
| 9,536,590 B1* | 1/2017 | Zhu | G11C 7/10 |

(Continued)

OTHER PUBLICATIONS

NPL Search (Google Scholar) (Year: 2021).*

*Primary Examiner* — Mahfuzur Rahman
*Assistant Examiner* — Richard W Cruz-Franqui
(74) *Attorney, Agent, or Firm* — Hamilton, Brook, Smith & Reynolds, P.C.

(57) ABSTRACT

A network processor provides for in-line encryption and decryption of received and transmitted packets. For packet transmittal, a processor core generates packet data for encryption and forwards an encryption instruction to a cryptographic unit. The cryptographic unit generates an encrypted packet, and enqueues a send descriptor to a network interface controller, which, in turn, constructs and transmits an outgoing packet. For received encrypted packets, the network interface controller communicates with the cryptographic unit to decrypt the packet prior to enqueuing work to the processor core, thereby providing the processor core with a decrypted packet.

9 Claims, 8 Drawing Sheets

(56) References Cited

U.S. PATENT DOCUMENTS

| | | | |
|---|---|---|---|
| 2006/0056406 A1* | 3/2006 | Bouchard | H04L 12/56 370/389 |
| 2006/0075119 A1* | 4/2006 | Hussain | H04L 69/162 709/227 |
| 2006/0262808 A1 | 11/2006 | Lin et al. | |
| 2011/0161641 A1* | 6/2011 | Chen | G06F 9/30047 712/234 |
| 2013/0100812 A1* | 4/2013 | Snyder, II | H04L 49/505 370/236 |
| 2013/0198416 A1* | 8/2013 | Zhu | G06F 3/061 710/6 |
| 2013/0209103 A1* | 8/2013 | Melts | H04J 14/0249 398/58 |
| 2013/0312007 A1* | 11/2013 | Millman | G06F 9/526 718/106 |
| 2013/0315054 A1* | 11/2013 | Shamis | H04L 47/12 370/225 |
| 2014/0075085 A1* | 3/2014 | Schroder | G06F 13/4022 710/317 |
| 2015/0249603 A1* | 9/2015 | Tompkins | H04L 47/34 370/392 |
| 2015/0249604 A1* | 9/2015 | Folsom | H04L 49/25 370/392 |
| 2015/0249620 A1* | 9/2015 | Folsom | H04L 45/74 370/392 |
| 2020/0099669 A1* | 3/2020 | Kessler | H04L 49/9068 |

\* cited by examiner

TRANSMIT PACKET

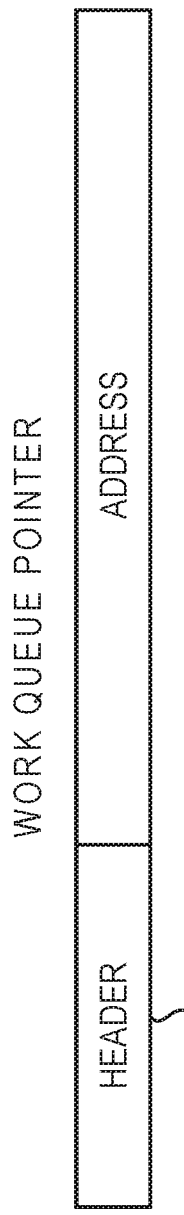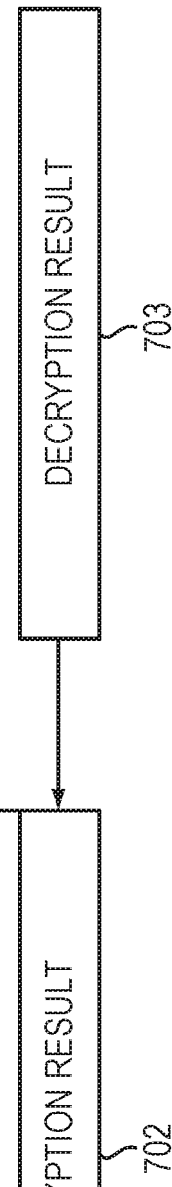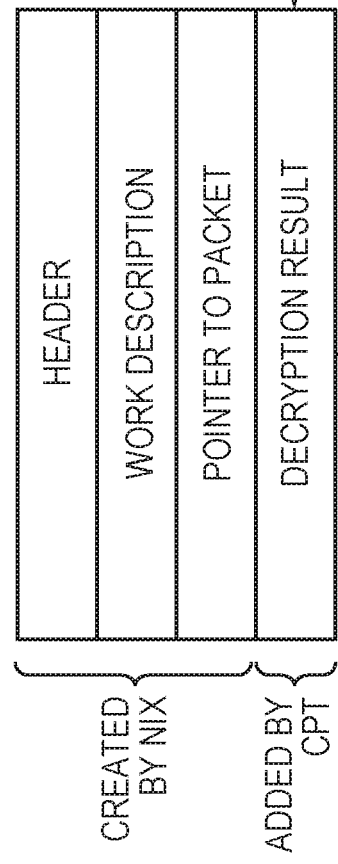

SECURE IN-LINE NETWORK PACKET TRANSMITTAL

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application-aware systems operate to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPsec), Anti-Virus (AV) and Anti-Spam functionality at wire-speed. IPsec, in particular, is a framework of standards for providing secure communications over IP networks through the use of cryptographic security services. IPsec supports network-level peer authentication, data integrity, authentication of data origin, data encryption, and replay protection.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Typical network processors schedule and queue work such as packet processing operations for upper level network protocols, and allow processing with respect to upper level network protocols (e.g., transport and application layers) in received packets before forwarding the packets to connected devices. The functions typically performed by network processors include packet filtering, queue management and priority, quality of service enforcement, and access control. By employing features specific to processing packet data, network processors can optimize an interface of a networked device.

SUMMARY

Example embodiments include a network services processor configured to transmit and receive packets through a secure communications channel, such as an IPsec channel. In one embodiment, the network service processor may include a network parser, a network interface controller, a cryptographic engine, and a packet processor. The network parser may be configured to determine an encryption status from a packet header of a packet, where the encryption status indicates whether the packet is a candidate for decryption. The network interface controller may be configured to create a work queue entry indicating that packet processing is required for the packet. The controller may also selectively forward a decryption command based on the encryption status. The cryptographic unit, operating as a decryption engine, may be configured to decrypt the packet in response to the decryption command and generate a decrypted packet. The packet processor may be configured to process the packet based on the work queue entry, where the packet processor accesses the packet or the decrypted packet as a function of the encryption status.

Further embodiments may include a network processor comprising a packet processor, a cryptographic unit, and a network interface controller. The packet processor may be configured to generate a packet and selectively generate an encryption instruction for the packet. The cryptographic unit, operating as an encryption engine, may be configured, in response to the encryption instruction, to 1) encrypt the packet to generate an encrypted packet, and 2) forward the encrypted packet and a send descriptor. The a network interface controller may be configured to construct an outgoing packet from the encrypted packet based on the send descriptor received from the encryption engine.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 7A-C illustrate data entries implemented in example embodiments.

DETAILED DESCRIPTION

A description of example embodiments follows.

Figure 1:
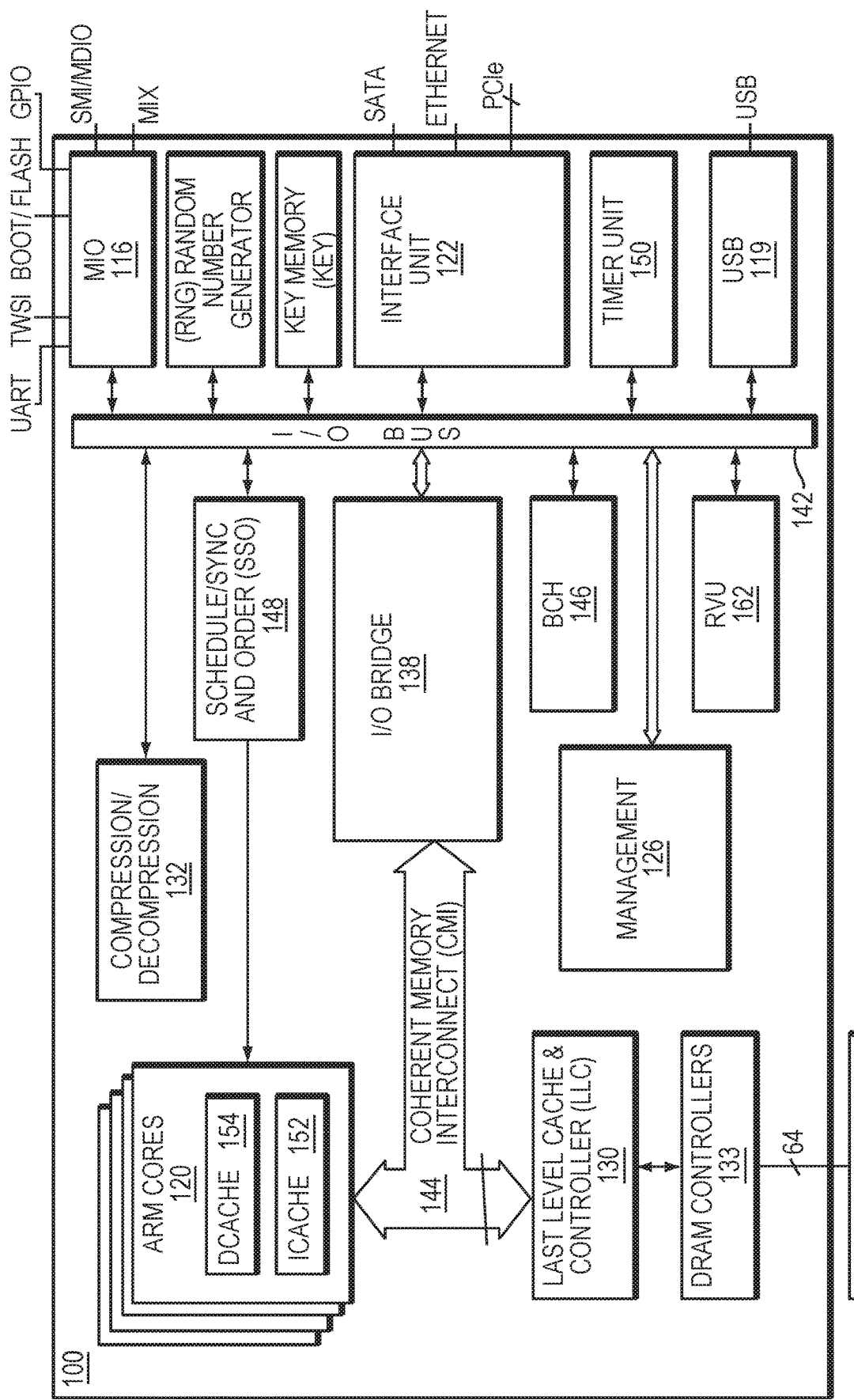
FIG. 1 is a block diagram illustrating a network services processor in which embodiments of the present invention may be implemented.

FIG. 1 is a block diagram illustrating a network services processor 100. The network services processor 100 may process Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by an interface unit 122. The interface unit 122 performs pre-processing of the received packet by checking various fields in the network protocol headers (e.g., L2, L3 and L4 headers) included in the received packet, and may perform checksum checks for TCP/User Datagram Protocol (UDP) (L3 network protocols). The interface unit 122 may receive packets via multiple network interface protocols, such as Ethernet and Peripheral Component Interconnect Express (PCIe). In a further embodiment, the interface unit 122 may be configured to receive packets from a plurality of X Attachment Unit Interfaces (XAUI), Reduced X Attachment Unit Interfaces (RXAUI), Serial Gigabit Media Independent Interfaces (SGMII), 40GBASE-R, 50GBASE-R, and/or 100GBASE-R. The interface unit 122 may also prepare and transmit outgoing packets via one or more of the aforementioned interfaces.

The interface unit 122 may then writes packet data into buffers in the last level cache and controller (LLC) 130 or external DRAM 108. The packet data may be written into the buffers in a format convenient to higher-layer software executed in at least one of the ARM processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets.

An I/O bridge 138 is configured to manage the overall protocol and arbitration and provide coherent I/O portioning with an I/O Bus 142. The I/O bridge 138 may include buffer queues for storing information to be transferred between a coherent memory interconnect (CMI) 144, the I/O bus 142, and the interface unit 122. The I/O bridge 138 may comprise a plurality of individual bridges on which communications and arbitration can be distributed.

The miscellaneous I/O interface (MIO) 116 can include auxiliary interfaces such as General Purpose I/O (GPIO), Flash, IEEE 802 two-wire Management Data I/O Interface (MDIO), Serial Management Interface (SMI), Universal Asynchronous Receiver-Transmitters (UARTs), two wire serial interface (TWSI), and other serial interfaces.

A Schedule/Sync and Order (SSO) module 148 queues and schedules work for the processor cores 120. Work is queued by adding a work queue entry to a queue. For example, a work queue entry is added by the interface unit 122 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154. In one embodiment, the network services processor 100 includes 24 ARM processor cores 120. In some embodiments, each of the ARM processor cores 120 may be an implementation of the ARMv8.2 64-bit architecture, and may be compatible with the ARMv8.2 software ecosystem and include hardware floating point, SIMD, and MMU support. In such an embodiment, consistent with the ARMv8.2 architecture, the cores 120 may contain full hardware support for virtualization. Guest operating systems can thus run at ARM defined user and operating system privilege levels, and hypervisor software can run in a separate higher privilege level. The cores 120 may also supports a secure state in which software may run in three different privilege levels while hardware provides isolation from the nonsecure state.

Last level cache and controller (LLC) 130 and external DRAM 108 are shared by all of the processor cores 120 and I/O co-processor devices. Each processor core 120 is coupled to the LLC 130 by the CMI 144. The CMI 144 is a communication channel for all memory and I/O transactions between the processor cores 120, the I/O bridge 138 and the LLC 130. In one embodiment, the CMI 144 is scalable to multiple (e.g., 24) processor cores 120, supporting fully-coherent Level-1 data caches 154 with write through. The CMI 144 may be highly-buffered with the ability to prioritize I/O.

The controller of the LLC 130 maintains memory reference coherence. It returns the latest copy of a block for every fill request, whether the block is stored in LLC 130, in external DRAM 108, or is "in-flight." A plurality of DRAM controllers 133 supports the external DRAM 108, and can support preferred protocols, such as the DDR4 protocol.

After a packet has been processed by the processor cores 120, the interface unit 122 reads the packet data from the LLC 130, DRAM 108, performs L4 network protocol post-processing (e.g., generates a TCP/UDP checksum), forwards the packet through the interface unit 122 and frees the LLC 130/DRAM 108 used by the packet. The DRAM Controllers 133 manage in-flight transactions (loads/stores) to/from the DRAM 108.

A resource virtualization unit (RVU) 162 may enable software to map various local function (LF) resources in various modules into several physical functions (PFs) and virtual functions (VFs). This enables multi-unit software drivers compatible with Linux, Windows and DPDK. A Bose Chaudhuri Hocquenghem Unit (BCH) 146 may implement a BCH cyclic error-correcting code capable of correcting many errors within a block of data. The BCH 146 may accelerate both parity-generation and the error-correction functions.

A management module 126 may include various units for managing operation of the network services processor 100. For example, the management module 126 may include a temperature sensor, a power serial bus master interface to determine current performance and energy consumption, and a memory diagnostic controller to detect and report memory errors. The module 126 may further include control processors, such as a system control processor for power management and other secure chip management tasks, and a module control processor for module management and other nonsecure chip management tasks.

Figure 2:
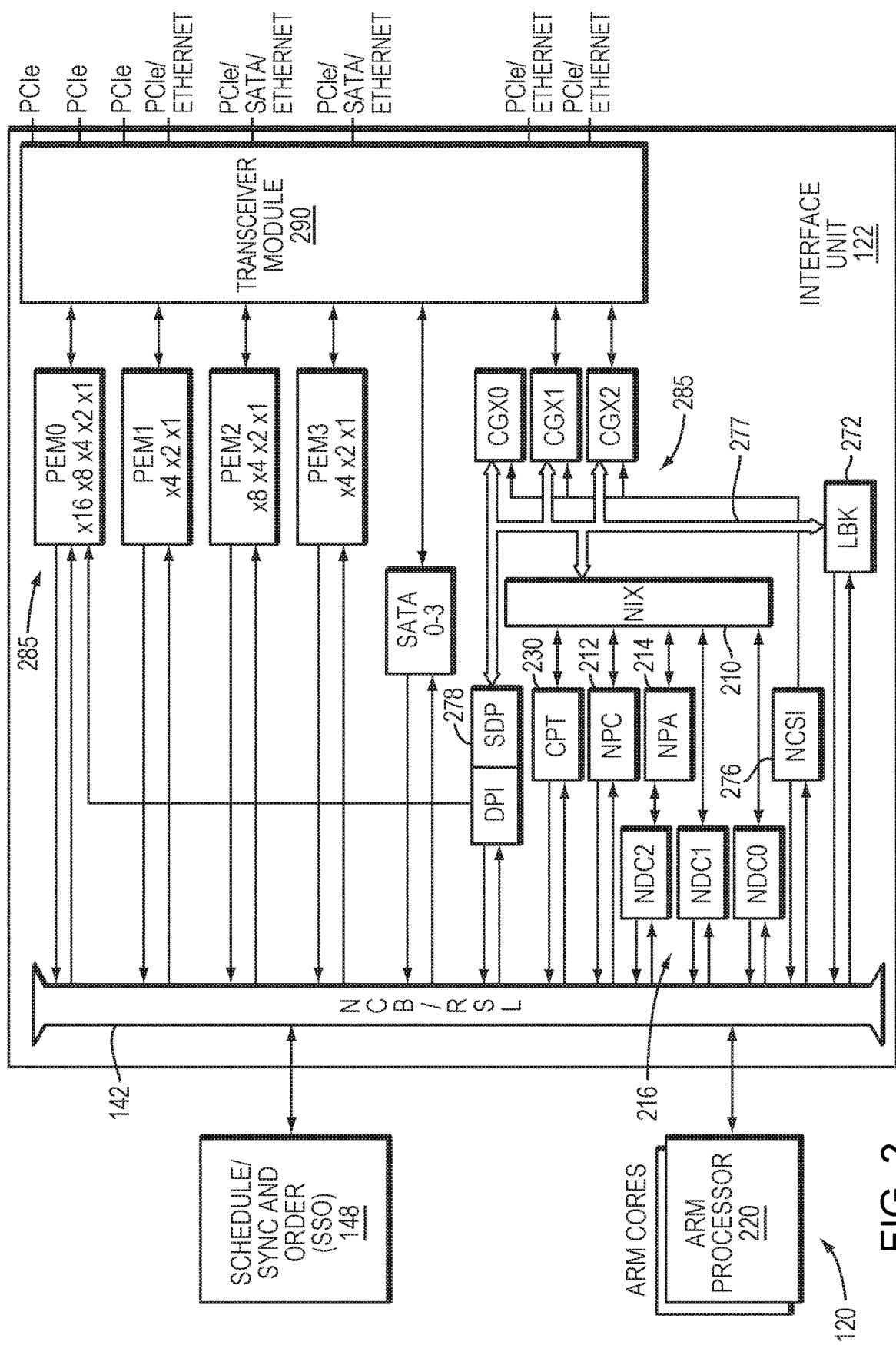
FIG. 2 is a block diagram of a networking and input/output portion of the network services processor of FIG. 1.

FIG. 2 is a block diagram of the interface unit 122 in further detail. Transceiver module 290 transmits and receives signals in accordance with one or more communications protocols, such as PCIe, Ethernet, and SATA. Interface modules 285, including PCI Express interface units (PEM0-PEM3), a SATA interface unit (SATA), and Ethernet I/O controllers (CGX0-CGX2) process received and outgoing signals in accordance with their respective protocols. A network controller sideband interface (NCSI) unit 276 provides an interface and protocol controller for a NCSI bus 277, which provides network packet data from/to the CGX interface modules 285.

A network interface unit (NIX) 210 provides a controller and direct memory access (DMA) engines to process and move network packets. The NIX 210 transmits and receives packets to and from the aforementioned interfaces 285, and communicates with the SSO module 148 to schedule work for the cores 120 to further process the packets. The NIX may also communicate with the cores 120 to forward work in lieu of the SSO 148, and can receive packets from the cores 120 for transmission. The cores 120, shown in FIG. 1, may include processors such as an ARM processor 220 as shown in FIG. 2. The NIX may include a transmit subunit (NIX-TX) and a receive subunit (NIX-RX), and a loopback module (LBK) 272 enables packets transmitted by NIX-TX to be looped back and received by NIX-RX.

The NIX 210 operates with a number of coprocessors. In particular, a network parser CAM unit (NPC) 212 parses network packets received for or transmitted from the NIX. A network pool allocator unit (NPA) 214 may allocate and free pointers for packet, work-queue entry, send descriptor buffers, and may support integration with a virtualization scheme. The SSO 148, as described above, schedules work-queue entries for NIX packets. A cryptographic accelerator unit (CPT) 230 optionally decrypts Internet Protocol Security (IPsec) packets received by the NIX 210 and can encrypt data for outgoing packets. A data cache (NDC0-NDC1) 216 is a common data cache block for use by the NIX 210 and NPA 214.

Figure 3:
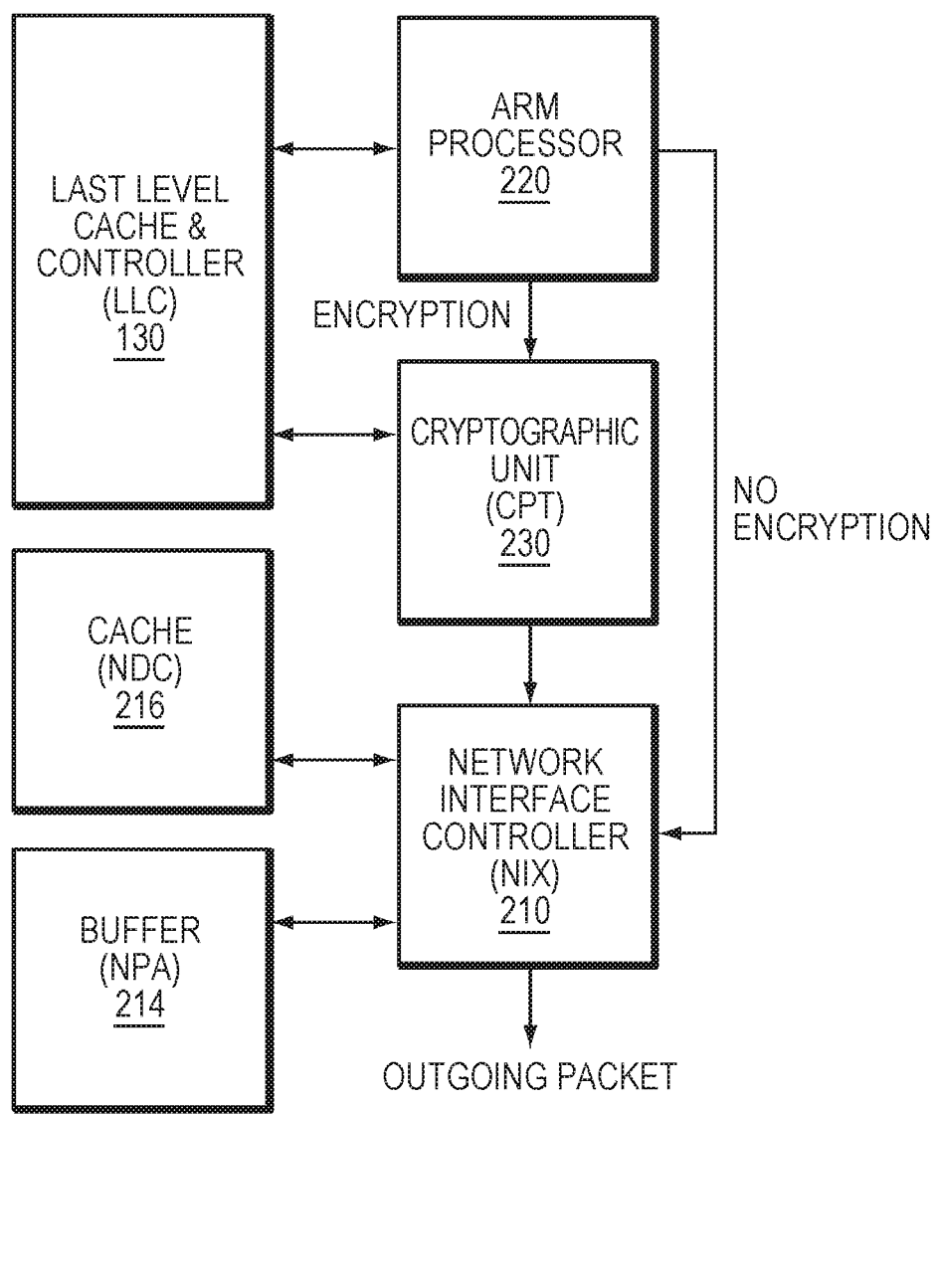
FIG. 3 is a block diagram of components operating to transmit a packet in one embodiment.

FIG. 3 is a simplified block diagram of a subset of the components of the network services processor 100 implemented in creating and transmitting an outgoing packet. The ARM processor 220 generates packet data for transmission. If a packet is to be encrypted, the CPT 230 encrypts the packet data before forwarding it to the NIX 210. Otherwise, the ARM processor 220 may forward the unencrypted packet data directly to the NIX 210. The NIX 210 then assembles the outgoing packet (e.g., by formatting the data, adding a packet header or other metadata, etc.), and transmits the outgoing packet.

Under previous network encryption techniques, such as those providing IPsec encryption, a processor originating a packet data communicates repeatedly with an encryption circuit and an interface controller. For example, the processor may forward encryption instructions to the encryption circuit, and the encryption circuit may return an encrypted packet to the processor. The processor may then forward the encrypted packet to the interface controller for assembly into an outgoing packet. Such an approach involves additional work by the processor compared to the transmittal of an unencrypted packet, and the additional communications between components can slow packet transmittal and reduce the efficiency of the network processor.

Example embodiments provide for in-line encryption of packets for transmittal in a network processor. With reference to FIG. 3, the ARM processor 220 may generate packet data for encryption, and then forwards encryption instructions to the CPT 230. The CPT then encrypts the packet, and forwards the encrypted packet, as well as instructions for assembling the respective outgoing packet, to the NIX 210. Therefore, the ARM processor 220 can provide a single communication per packet, regardless of whether the packet is to be encrypted, and need not be further involved with the packet following the communication. A packet to be encrypted is thus processed for transmittal in-line with the modules 220, 230, 210, paralleling the process for an unencrypted packet with the exception of recruiting the CPT 230. As a result, workload to the ARM processor 220 is reduced, and communications between the modules 220, 230, 210 are minimized, thereby improving the efficiency and latency of the network processor.

Figure 4:
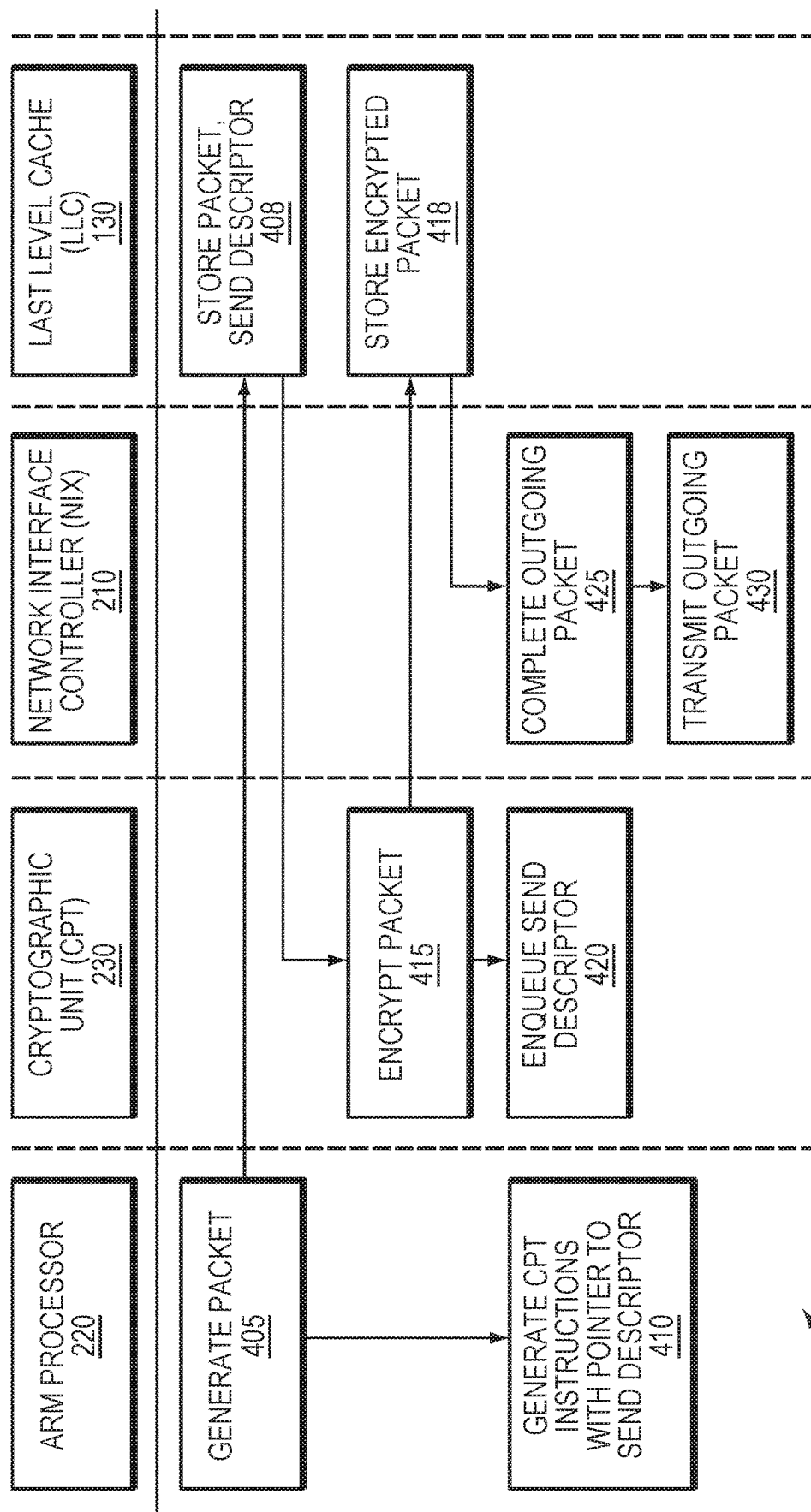
FIG. 4 is a flow diagram of a packet transmit operation in one embodiment.

FIG. 4 is a flow diagram of an example process 400 of generating and transmitting an encrypted outgoing packet. With reference to FIG. 3, the ARM processor 220 may generate a packet (405), and store the packet, along with a corresponding send descriptor, to the LLC 130 or other memory, such as a cache or DRAM 108 (408). The send descriptor may also be cached by the NDC 216. The send descriptor provides instructions for the NIX 210 to construct an outgoing packet containing the respective packet. For example, the send descriptor may include 1) instructions to generate the packet header of the outgoing packet, 2) information to attach to the packet header, 3) instructions for breaking a large packet into multiple smaller packets, 4) instructions to calculate and insert a checksum into the outgoing packet, 5) instructions to color, shape, police, and/or mark the packet in a particular way, and/or other information or instructions. The ARM processor 220 may then generate encryption instructions for the CPT 230 to encrypt the packet (415). The encryption instructions may direct the CPT 230 to encrypt the packet in accordance with a given encryption protocol, such as IPsec. The encryption instructions may also include a pointer to the send descriptor, thereby enabling the CPT 230 to direct the NIX 210 without further action by the ARM processor 220. The CPT 230 may therefore determine the pointer to the send descriptor by parsing the encryption instructions from the ARM processor 220.

The CPT 230 encrypts the packet accordingly (415), and may store a corresponding encrypted packet to the LLC 130 or other memory (418). The CPT 230 may then enqueue the send descriptor for processing by the NIX 210 (420). When the CPT 230 enqueues the send descriptor, it may first read the send descriptor from memory, and then send it to NIX 210. The NIX 210 may be responsible for enqueuing the send descriptor received from CPT 230. This action may involve caching the send descriptor at the NDC 216. The send descriptor may be created by ARM software, and may remain unmodified by the CPT 230 or NIX 210.

Optionally, the CPT 230 may enqueue the send descriptor by forwarding the send descriptor pointer to the NIX 210, or by updating a packet queue for the NIX 210. In order to direct the NIX 210 to access the encrypted packet, the CPT 230 may modify the send descriptor (or the send descriptor pointer) to identify the address of the encrypted packet. For example, the CPT 230 may add a new pointer to the send descriptor, or may rewrite a pointer to the unencrypted packet, replacing it with a pointer to the encrypted packet. Alternatively, the CPT 230 may write the encrypted packet to the same address as the unencrypted packet, overwriting the unencrypted packet. In a further alternative, the CPT 230 may associate the send descriptor pointer with a pointer to the encrypted packet, forwarding both pointers to the NIX 210.

The NIX 210, upon receiving the send descriptor, may read the send descriptor and construct the outgoing packet in accordance with the instructions in the send descriptor (425). Based on the information provided by the CPT 230 as describe above, the NIX 210 may also access the encrypted packet to incorporate it into the outgoing packet. If the packet is suitably large, the NIX 210 may construct multiple outgoing packets corresponding to the packet. The NIX 210 may transmit the outgoing packets in order (430), and can free the respective packet buffers to the NPA after transmission.

The CPT 230 may be further configured to manage encryption operations and workflow. For example, if the CPT 230 encounters an error when encrypting a packet, it may refrain from encrypting the packet, and may instead communicate with the SSO 148 (FIGS. 1-2) to enqueue work to address the error, and/or may cause an interrupt. The ARM processor 220, in response to the interrupt or an SSO instruction, can determine further actions to address the error. Further, the CPT 230 may manage a CPT queue of work (e.g., encryption and/or decryption requests). Before enqueuing a CPT instruction, the CPT 230 and/or the ARM processor 220 may confirm that the CPT queue will not overflow. The ARM processor 220 may operate software configured to avoid overflowing the CPT queues and NIX send queues. For the NIX send queue case, the NPA 214 may keep an LLC/DRAM location up-to-date with information effectively describing the NIX send queue occupancy. For the CPT queue case, the CPT 230 can keep an LLC/DRAM location up-to-date with queue occupancy. The ARM software can consult these LLC/DRAM locations before deciding to enqueue in CPT queue and/or NIX send queue.

In further embodiments, the CPT can monitor the status of both the CPT queue and a queue implemented by NIX 210 for outgoing packets, such as the NPA buffers 214. Before enqueuing the packet at the NIX 210, the CPT 230 may check the status of the NPA 214 to verify buffer capacity. The CPT can refrain from enqueuing the packet until it verifies buffer capacity, thereby preventing an overflow error. In further embodiments, one or both of the CPT 230 and NIX 210 may issue a backpressure command to upstream modules to prevent overflow. For example, the NIX 210 may issue a backpressure command to the CPT 230, causing the CPT 230 to refrain from enqueuing further send descriptors. The backpressure command may be a direct communication, or may be conveyed by writing a current queue size to memory.

Figure 5:
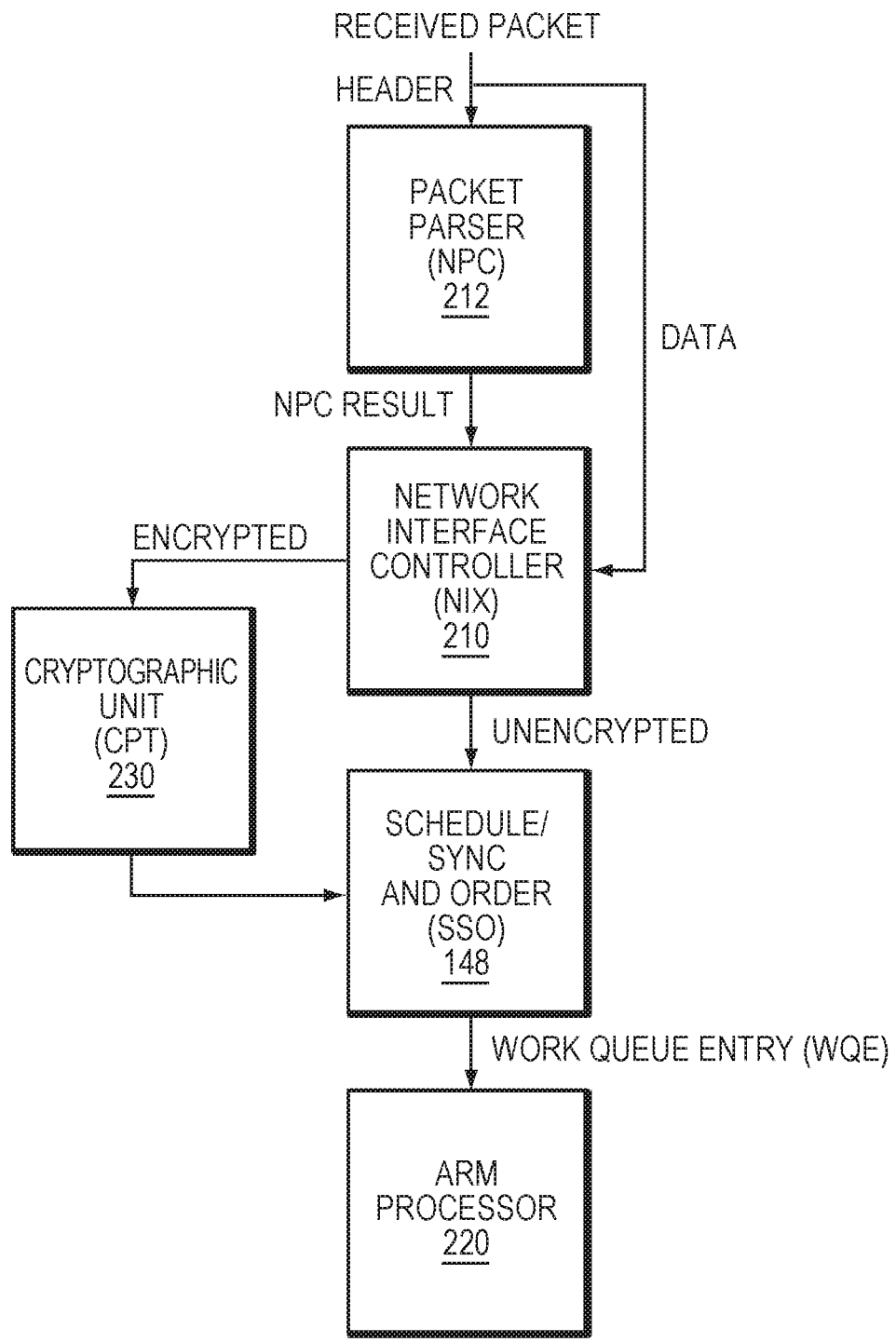
FIG. 5 is a block diagram of components operating to receive a packet in one embodiment.

FIG. 5 is a simplified block diagram of a subset of the components of the network services processor 100 implemented in receiving and processing a packet. The NPC 212 parses the packet header of a received packet, and provides a NPC result. The NPC result provides information for processing the packet, and in particular, identifies whether the packet is a candidate for decryption. Candidacy for decryption may be determined by one or more properties of the packet, such as IP address, or whether the packet is an IPsec packet. For example, the NPC 212 may restrict candidacy to IPsec packets originating from a given IP address. For packets meeting the criteria, the NPC 212 may associate a tag with the NPC result indicating that it is a candidate for decryption. To process the packet data, the NIX 210 schedules work for the ARM processor 220 via the SSO 148. If the packet is to be decrypted, the CPT 230 decrypts the packet data before forwarding it to the SSO 148. Otherwise, the NIX 210 may forward the unencrypted packet data directly to the SSO 148. The SSO 148 manages a work queue to schedule work for the ARM processor 220, and the ARM processor 220 process the packet in accordance with a corresponding queue entry, such as a work queue entry (WQE).

Under previous network decryption techniques, such as those providing IPsec protocol, a processor receiving encrypted packet data communicates repeatedly with a decryption circuit and an interface controller. For example, the processor may first receive the encrypted packet from the interface controller. Because the processor cannot work on encrypted data, it must forward encryption instructions to the decryption circuit, and the decryption circuit may return a decrypted packet to the processor. The processor may then access the decrypted packet data, and process the decrypted data as instructed. Such an approach involves additional work by the processor compared to receiving an unencrypted packet, and the additional communications between components can slow packet reception and reduce the efficiency of the network processor.

Example embodiments provide for in-line decryption of received packets in a network processor. With reference to FIG. 5, the NIX 210 determines whether a received packet is a candidate for decryption (based on the NPC result), and if so, it forwards decryption instructions to the CPT 230. The CPT then decrypts the packet, and update a WQE at the SSO 148 to indicate the decrypted packet. Therefore, the ARM processor 220 begins a work assignment with a decrypted (or unencrypted) packet, and does not need to communicate with the CPT 230 to decrypt a packet. A packet to be decrypted is thus processed for transmittal in-line with the modules 212, 210, 230, 148, 220, paralleling the process for an unencrypted packet with the exception of recruiting the CPT 230. As a result, workload to the ARM processor 220 is reduced, and communications between the modules 220, 230, 210 are minimized, thereby improving the efficiency and latency of the network processor.

Figure 6:
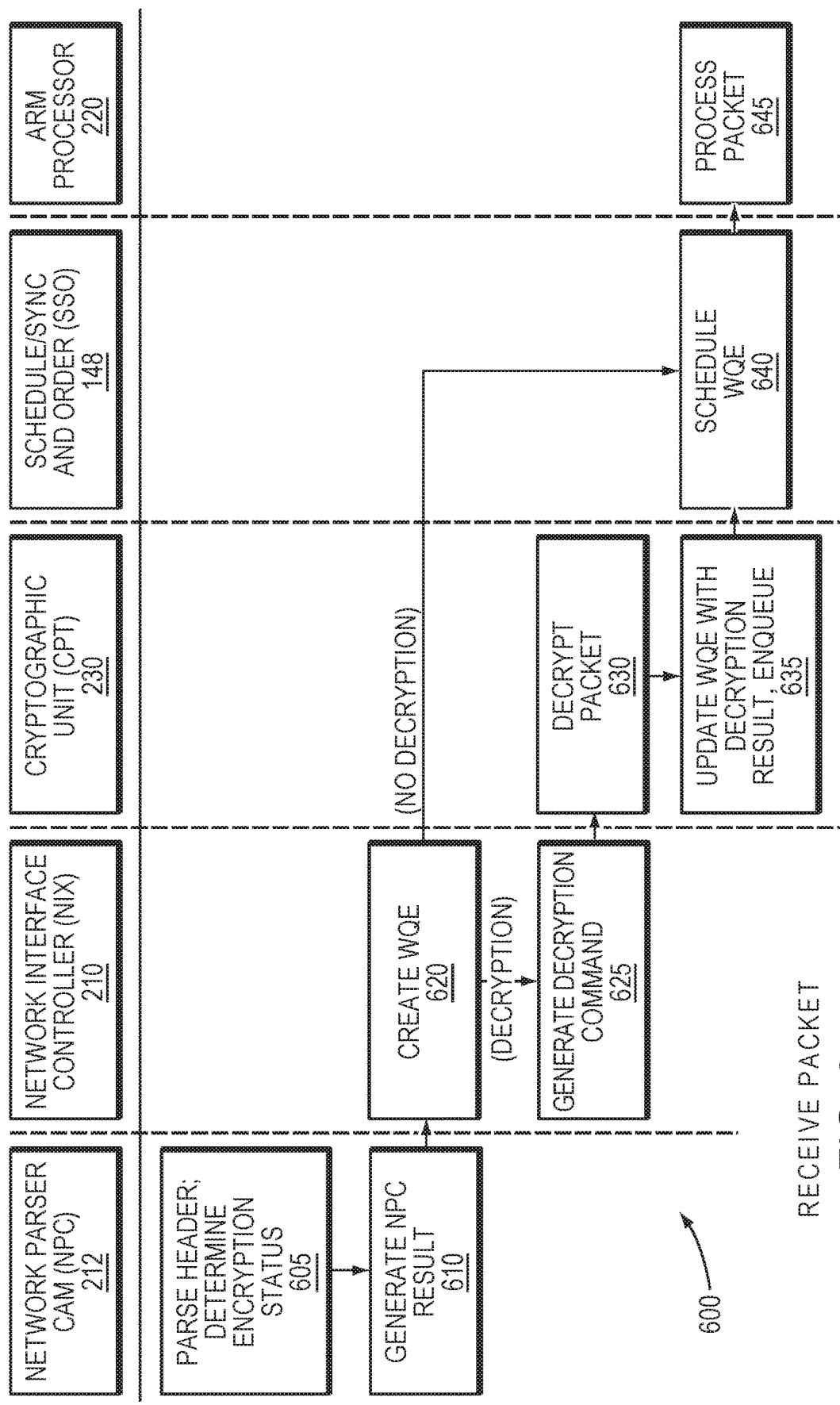
FIG. 6 is a flow diagram of a packet receive operation in one embodiment.

FIG. 6 is a flow diagram of an example process 600 of receiving and processing a packet. With reference to FIG. 5, the NPC 212 parses the packet header of a received packet, and generates a NPC result indicating whether the packet is a candidate for decryption (605, 610). To process the packet data, the NIX 210 creates a WQE for the SSO 148 to assign work to the ARM processor 220 (620). For packets that are not candidates for decryption, the NIX 210 may enqueue the WQE to the SSO 148, which schedules the WQE (640). The SSO 148 can maintain the WQE in its work queue a work queue pointer (WQP), which is a pointer to the WQE. When the WQP is at top of the work queue, the SSO may forward the WQP to the ARM processor 220 to process the decrypted packet in accordance with the WQE (645).

For packets that are candidates for decryption, the CPT 230 may enqueue the WQE at the SSO 148 after it decrypts the packet, thereby maintaining order and preventing error. Alternatively, the NIX 210 may enqueue the WQE, but refrain from doing so until after the packet is decrypted. In the interim, the WQE may be stored to memory (e.g., the LLC 130 or NDC 216). To decrypt the packet, the NIX 210 generates a decryption command and forwards it to the CPT 230 (625).

The CPT 230 may then decrypt the packet, writing a decrypted packet to memory (e.g., the LLC 130 or DRAM 108) (630). Following decryption, the CPT 230 can access the WQE from memory and update it based on the decryption result (635). For example, the CPT 230 can modify the WQE by adding an indicator on whether the packet is successfully decrypted, as well as a pointer to the decrypted packet. It may also overwrite the pointer to the encrypted packet with the pointer to the decrypted packet. Alternatively, the CPT 230 may write the decrypted packet to the same address as the encrypted packet, overwriting the encrypted packet and enabling the WQE to proceed unmodified. In a further alternative, the CPT 230 may associate the WQE with a pointer to the decrypted packet without modifying the WQE itself, wherein the SSO may manage the WQE and the pointer concurrently.

Once the packet is decrypted and the WQE is updated accordingly, the CPT 230 may enqueue the WQE to the SSO 148, which schedules the WQE (640). The SSO 148 can maintain the WQE in its work queue via a work queue pointer (WQP), which is a pointer to the WQE. When the WQP is at top of the work queue, the SSO may forward the WQP to the ARM processor 220 to process the decrypted packet in accordance with the WQE (645).

FIGS. 7A-C illustrate data entries implemented in example embodiments. FIG. 7A illustrates an example WQP 701, FIG. 7B illustrates an example WQE 702, and FIG. 7C illustrates an example encryption result (CPT result) 703. As described above, and referring again to FIGS. 5-6, the SSO unit 148 queues each piece of work by adding a WQP 701 to a queue. The WQP 701 includes an address pointing to the corresponding WQE 702 in LLC/DRAM, as well as a header enabling the SSO 148 to identify and schedule the corresponding WQE 702. For example, the WQP 701 header may indicate a group, tag type, and tag corresponding to each piece of work, and may also indicate whether the corresponding packet is a candidate for decryption.

The SSO unit 148 can manage work by maintaining the WQP 701 to each WQE 702. The SSO 148 may store the WQP 701 and use this pointer when a core is available for processing new work. The SSO unit 148 may carry the WQP 701 along at all points when it is inside the SSO unit 148, because the WQP 701 indirectly describes the actual work that needs to be performed. The SSO 148 may then deliver the WQP 701 to a core (e.g., the ARM processor 220) when it is available for processing work.

The WQE 702, in LLC/DRAM, is the primary descriptor that describes each piece of work. The WQE may be created by the NIX 210 as described above, and can include several fields. A selection of those fields is shown in FIG. 7B. A WQE header may include the same information present in the WQP header as described above. The WQE header may also indicate whether the corresponding packet was forwarded to the CPT 230 for decryption. Alternatively, the WQE may include another entry indicating the decryption instructions sent to the CPT 230. The WQE also includes a description of the work, as well as a pointer to the corresponding packet in memory (e.g., the LLC 130 or DRAM 108).

The CPT result 703 may include an indication of the decryption result. The decryption result may indicate whether the decryption was successful, as well as other information about the decryption or decrypted packet. The CPT result 703 may optionally include a header providing identifying information. Further, if the decrypted packet is written to a different location than the encrypted packet, the CPT result 703 may also contain a pointer to the decrypted packet in memory. The CPT 230, upon deriving the CPT result 703, may update a corresponding WQE 702 by writing the decryption result and/or the pointer to the decrypted packet to it. Alternatively, the CPT 230 may forego generating a formal CPT result, and instead directly modify the WQE by writing the pointer and/or decryption result to it.

Figure 8:
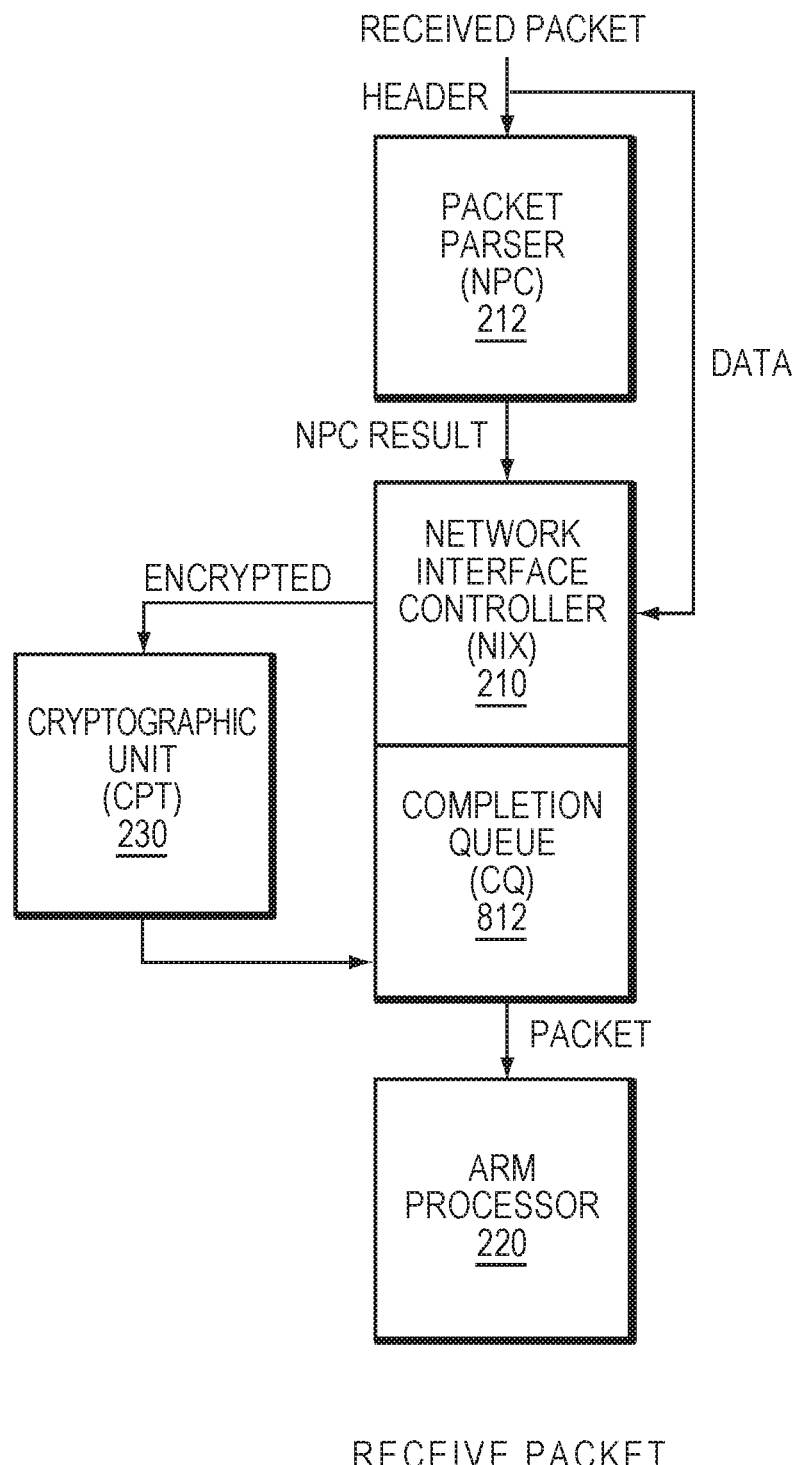
FIG. 8 is a block diagram of components operating to receive a packet in a further embodiment.

FIG. 8 is a simplified block diagram of a subset of the components of the network services processor 100 implemented in receiving and processing a packet in an alternative embodiment. The configuration may operate in a manner comparable to the configuration described above with reference to FIGS. 5-6, with the exception that the SSO 148 is replaced with a completion queue (CQ) 812. The CQ 812 may differ from the SSO 148 in that it can be a simpler queue that is managed by the NIX 210, and may lack some of the scheduling and synchronizing capabilities of the SSO 148.

For example, the CQ 812 may be a component of the NIX 210, and may include a single or queue or multiple queues for packet processing work. The NIX 210 can maintain proper order of the work by adding entries for packets to the CQ 812 in the order in which the packets were received, and then forwarding the work to the ARM processor 220 in accordance with the CQ 812. An embodiment of a WQE, as described herein, may be implemented with the CQ 812 instead of the SSO. In such an embodiment, the WQE may serve as an indicator that processing is required for a respective packet, and may omit some features utilized by the SSO 148, such as particular instructions for processing the packet.

While example embodiments have been particularly shown and described, it will be understood by those skilled in the art that various changes in form and details may be made therein without departing from the scope of the embodiments encompassed by the appended claims.

What is claimed is:

1. A circuit, comprising:
   a packet processor, implemented in a hardware processor, configured to request a work queue entry, generate a packet from data indicated by the work queue entry, and selectively generate an encryption instruction for the packet;
   an encryption engine configured, in response to the encryption instruction, to 1) encrypt the packet to generate an encrypted packet independent of operation by the packet processor, and 2) forward the encrypted packet and a send descriptor; and
   a network interface controller configured to construct an outgoing packet from the encrypted packet based on the send descriptor received from the encryption engine;
   wherein the packet processor is further configured to forward a pointer to the send descriptor to the encryption engine; and
   wherein the encryption engine is further configured to locate the send descriptor based on the pointer and forward the send descriptor to the network interface controller.

2. The circuit of claim 1, wherein the packet processor is further configured to 1) generate a non-secure packet, the non-secure packet not requiring encryption, and 2) forward a send descriptor corresponding to the non-secure packet to the network interface controller.

3. The circuit of claim 1, wherein the encryption engine is further configured to 1) encrypt a successive packet to generate a successive encrypted packet, and 2) forward the successive encrypted packet to the packet processor.

4. The circuit of claim 3, wherein the packet processor is further configured to forward the successive encrypted packet and a corresponding send descriptor to the network interface controller.

5. The circuit of claim 1, wherein the encryption engine is further configured to forward an error message to the packet processor in response to detecting an error during generation of the encrypted packet.

6. The circuit of claim 5, wherein the encryption engine is further configured to generate a queue entry indicating a request to process the error.

7. The circuit of claim 1, wherein the encryption engine is further configured to selectively forward the send descriptor to the network interface controller based on the status of a network interface controller queue.

8. The circuit of claim 7, wherein the network interface controller is further configured to selectively forward a backpressure command to at least one of the packet processor and the encryption engine based on the status of the network interface controller queue.

9. The circuit of claim 1, wherein the packet processor is further configured to selectively forward the encryption instruction to the encryption engine based on the status of an encryption engine queue.

* * * * *

UNITED STATES PATENT AND TRADEMARK OFFICE
CERTIFICATE OF CORRECTION

PATENT NO. : 11,038,856 B2
APPLICATION NO. : 16/142871
DATED : June 15, 2021
INVENTOR(S) : Richard E. Kessler It is certified that error appears in the above-identified patent and that said Letters Patent is hereby corrected as shown below:

In the Specification

In Column 2, Line 11, delete "The a" and insert -- The --;

In Column 3, Line 16, delete "(XAUI)," and insert -- (XAUIs), --;

In Column 3, Line 17, delete "(RXAUI)," and insert -- (RXAUIs), --;

In Column 3, Line 18, delete "(SGMII)," and insert -- (SGMIIs), --;

In Column 6, Line 64, delete "describe" and insert -- described --;

In Column 8, Line 38, delete "a" and insert -- as a --.

Signed and Sealed this
Twenty-first Day of March, 2023

*Katherine Kelly Vidal*

Katherine Kelly Vidal
*Director of the United States Patent and Trademark Office*